(12) United States Patent
Sayeed et al.

(10) Patent No.: US 8,538,327 B2
(45) Date of Patent: Sep. 17, 2013

(54) USER EQUIPMENT ADJUSTMENT OF UPLINK SATELLITE COMMUNICATIONS

(75) Inventors: Zulfiquar Sayeed, Highstown, NJ (US); Stephen A. Wilkus, Lincroft, NJ (US)

(73) Assignee: Alcatel Lucent, Paris (FR)

( * ) Notice: Subject to any disclaimer, the term of this patent is extended or adjusted under 35 U.S.C. 154(b) by 557 days.

(21) Appl. No.: 12/761,098

(22) Filed: Apr. 15, 2010

(65) Prior Publication Data

US 2011/0256865 A1 Oct. 20, 2011

(51) Int. Cl.
*H04B 7/19* (2006.01)
(52) U.S. Cl.
USPC .......... 455/13.2; 455/12.1; 455/427; 370/316
(58) Field of Classification Search
USPC ........ 455/12.1–13.3, 427–430; 370/316–317
See application file for complete search history.

(56) References Cited

U.S. PATENT DOCUMENTS

| | | | |
|---|---|---|---|
| 5,570,096 A * | 10/1996 | Knight et al. ............. | 342/357.31 |
| 5,644,572 A | 7/1997 | Olds et al. | |
| 7,821,421 B2 * | 10/2010 | Tamir et al. .................... | 340/901 |
| 2005/0095982 A1 * | 5/2005 | Blanchard et al. ........... | 455/12.1 |
| 2007/0021122 A1 | 1/2007 | Lane et al. | |
| 2010/0008458 A1 * | 1/2010 | Jiang et al. ..................... | 375/371 |
| 2011/0116386 A1 * | 5/2011 | Blanchard et al. ............. | 370/242 |

FOREIGN PATENT DOCUMENTS

| | | |
|---|---|---|
| WO | 01/48941 A2 | 7/2001 |
| WO | PCT/US2011/031179 | 7/2011 |

OTHER PUBLICATIONS

3GPP TS 36.213 V9.0.1 Technical Specification, "3rd Generation Partnership Project; Technical Specification Group Radio Access Network; Evolved Universal Terrestrial Radio Access (E-UTRA); Physical Layer Procedures (Release 9)," Dec. 2009, 79 pages.
3GPP TSG-RAN WG1 #46, "Considerations on E-UTRA Uplink Time Synchronization," Siemens, Tdoc R1-062372, Aug. 28-Sep. 1, 2006, 3 pages.
3GPP TSG RAN WG1 #47, "Ul Timing Control Accuracy and Update Rate," Nokia, R1-063377, Nov. 6-10, 2006, 3 pages.

* cited by examiner

*Primary Examiner* — Raymond Dean
(74) *Attorney, Agent, or Firm* — Ryan, Mason & Lewis, LLP

(57) ABSTRACT

User equipment of a communication system in one aspect obtains data indicative of the position of a satellite, and obtains data indicative of the position of the user equipment. The user equipment computes a delay measure based on the data indicative of the position of the satellite and the data indicative of the position of the user equipment, and adjusts the timing of a communication transmitted from the user equipment to the satellite based on the delay measure. In an illustrative embodiment, the user equipment receives data indicative of position and velocity of the satellite, and adjusts both timing and frequency of the communication based on the position and velocity data. The timing and frequency adjusted communication may then be transmitted to the satellite over a unicast uplink channel.

21 Claims, 3 Drawing Sheets

USER EQUIPMENT ADJUSTMENT OF UPLINK SATELLITE COMMUNICATIONS

FIELD OF THE INVENTION

The present invention relates generally to communication systems, and more particularly to techniques for facilitating communication between user equipment and one or more satellites in such systems.

BACKGROUND OF THE INVENTION

Wireless communication standards continue to evolve. For example, in the cellular context, standards are currently evolving from third generation (3G) standards to fourth generation (4G) standards. The 3G standards include GSM and UMTS standards promulgated by an organization known as the 3G Partnership Project (3GPP) and CDMA2000 standards such as High Rate Packet Data (HRPD) promulgated by an organization referred to as 3GPP2. The 4G standards currently under development by 3GPP are generally referred to as Long Term Evolution (LTE) standards. The 3GPP and 3GPP2 standards documents, including, for example, 3GPP Technical Specification (TS) 36.213, Group Radio Access Network, Evolved Universal Terrestrial Radio Access (E-UTRA), Physical Layer Procedures, Release 9, V9.0.1, December 2009, are incorporated by reference herein in their entirety.

LTE networks make use of an Internet protocol (IP) based packet core referred to as Evolved Packet Core (EPC). User equipment (UE) communicates with the EPC via an access network that includes an enhanced base station referred to as an evolved NodeB (eNodeB). The uplink between the UE and the eNodeB uses SC-FDMA (Single Carrier FDMA). Uplink communications from multiple UEs within a given cell should be received orthogonally at the eNodeB in order to minimize interference. The desired orthogonal reception is achieved using a closed-loop control system in which the eNodeB estimates the uplink timing of the UEs by detecting a prime length Zadoff-Chu sequence in a random access preamble (PRACH) received from each UE and then based on this estimated timing sends periodic timing advance instructions to the UEs. Additional details of this conventional timing adjustment process can be found in, for example, the above-cited 3GPP TS 36.213, and also in "LTE—The UMTS Long Term Evolution," S. Sesia et al., eds., ISBN 9780470697160, Wiley InterScience, 2009.

The performance of the above-described conventional closed-loop control system generally improves with decreasing cell size. This is because smaller cells will typically have more orthogonal sequences available and therefore a better detection probability for any particular sequence.

SUMMARY OF THE INVENTION

We have recognized that the conventional closed-loop control approach described above becomes intractable in communication systems in which multiple UEs communicate with one or more satellites. This is due in part to variation in instantaneous time-frequency drift over a given coverage area of the satellite, as such coverage areas are typically much larger than the size of an LTE network cell. For example, the satellite coverage area may be so large as to encompass the entire continental United States. Problems associated with use of the conventional closed-loop control approach in the satellite context are compounded by the round trip delays required for its operation.

Illustrative embodiments of the present invention overcome the above-noted drawbacks of conventional practice by providing techniques for adjusting uplink communications between multiple UEs and a satellite without the need for closed-loop control.

In accordance with one aspect of the invention, user equipment of a communication system receives or otherwise obtains data indicative of the position of a satellite, and receives or otherwise obtains data indicative of the position of the user equipment. The user equipment computes a delay measure based on the data indicative of the position of the satellite and the data indicative of the position of the user equipment, and adjusts the timing of a communication transmitted from the user equipment to the satellite based on the delay measure.

In one of the illustrative embodiments, the user equipment receives data indicative of the position and velocity of the satellite, and adjusts both timing and frequency of the communication based on the data indicative of the position and velocity of the satellite and the data indicative of the position of the user equipment. The timing and frequency adjusted communication may then be transmitted to the satellite over, for example, a unicast uplink channel.

Advantageously, the illustrative embodiments can provide significantly improved performance in communication systems in which multiple UEs need to communicate in an orthogonal manner with a satellite receiver, without unduly increasing system cost or complexity.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for timing and frequency adjustment of uplink communications between UEs and a satellite. It should be understood, however, that the invention is not limited to use with the particular types of communication systems and timing and frequency adjustment techniques disclosed. The invention can be implemented in a wide variety of other communication systems, using alternative processing steps. For example, although illustrated in the context of LTE, the disclosed techniques can be adapted in a straightforward manner for use with any satellite based mobile communication service, and more generally any system in which UEs communicate via an uplink with a satellite. Such systems may include systems such as GSM and UMTS that utilize time division duplexing (TDD) or frequency division duplexing (FDD).

Figure 1:
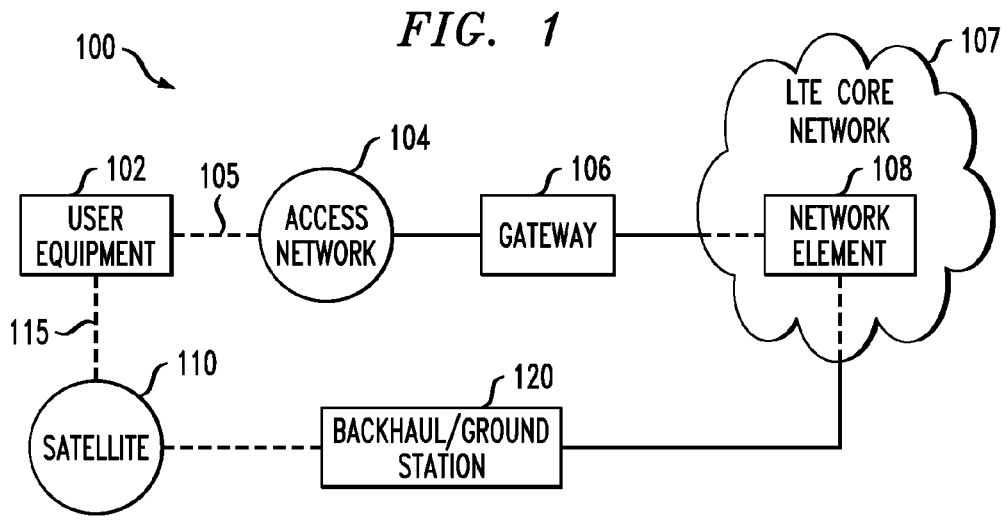
FIG. 1 is a block diagram of a communication system in an illustrative embodiment of the invention.

FIG. 1 shows a communication system 100 comprising user equipment (UE) 102 that communicates with an access network 104 via a wireless channel 105. The access network is coupled via a gateway 106 to an LTE core network 107 that comprises multiple routers, switches or other network elements such as network element 108.

The user equipment 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including combinations of multiple devices such as a data card inserted in a laptop. These communication devices may also be referred to as "access terminals."

The access network 104 may comprise a plurality of base stations and one or more associated radio network controllers (RNCs). The base stations and RNCs are logically separate entities, but in a given embodiment may be implemented in the same physical network element, such as, for example, a base station router or femto cellular access point.

In the present illustrative embodiment, the user equipment 102 also communicates with a satellite 110 via a wireless channel 115. The satellite communicates with ground station and backhaul network 120 and is thereby able to interface with the LTE core network 107 that includes network element 108.

The communication system 100 may therefore be viewed as a type of hybrid system in which the user equipment 102 is able to access the core network 107 via conventional LTE network elements such as eNodeBs in access network 104 and also via the satellite 110. Such capability allows the user equipment 102 to be utilized in remote areas without LTE cell coverage, thereby facilitating use of the satellite for "gap filling" in an otherwise conventional LTE network. The user equipment 102 can also be used to implement, for example, a mobile IP service via satellite, and in such embodiments need not have capability for communicating directly with terrestrial networks.

The FIG. 1 arrangement is just one exemplary configuration of a communication system, and numerous alternative arrangements of system elements may be used in other embodiments. For example, although only single instances of user equipment 102, access network 104, gateway 106, network element 108, satellite 110 and ground station and backhaul 120 are shown in the FIG. 1 embodiment, this is for simplicity and clarity of description only. A given alternative embodiment of the invention may of course include larger numbers of such system elements, as well as additional or alternative elements of a type commonly associated with conventional system implementations.

As will be described in greater detail below, the illustrative embodiment of the system 100 is configured such that user equipment 102 performs timing and frequency adjustment of its uplink communications with satellite 110 so as to ensure that such uplink communications from multiple UEs within the same coverage area of the satellite are received orthogonally at the satellite.

It should be noted that the multiple UEs do not have to be in proximity to one another. For example, a UE in Los Angeles may not be able to receive a signal from a UE in San Diego, but a satellite with a coverage area that includes Los Angeles and San Diego will receive both their signals. However, these signals will not be received orthogonal to one another at the satellite receiver, that is, the signals will overlap one another in time and frequency. Also, there are significant variations in satellite position and velocity that occur over each 24-hour period, due to predictable changes in gravity effects. This "wobbling" of the satellite, also referred to as analemma, can cause large delay and frequency variations relative to the guard time or cyclic prefix typically used in LTE communications. The satellite wobble is further aggravated by the inter-UE distances, in that the larger the inter-UE distance, the larger the wobble and the more the delay and frequency of communications from the UE will differ when received at the satellite. The timing and frequency adjustments provided by illustrative embodiments of the invention advantageously compensate for the satellite wobble and other delay and frequency variations between communications received from multiple UEs that are separated by potentially large distances.

Figure 2:
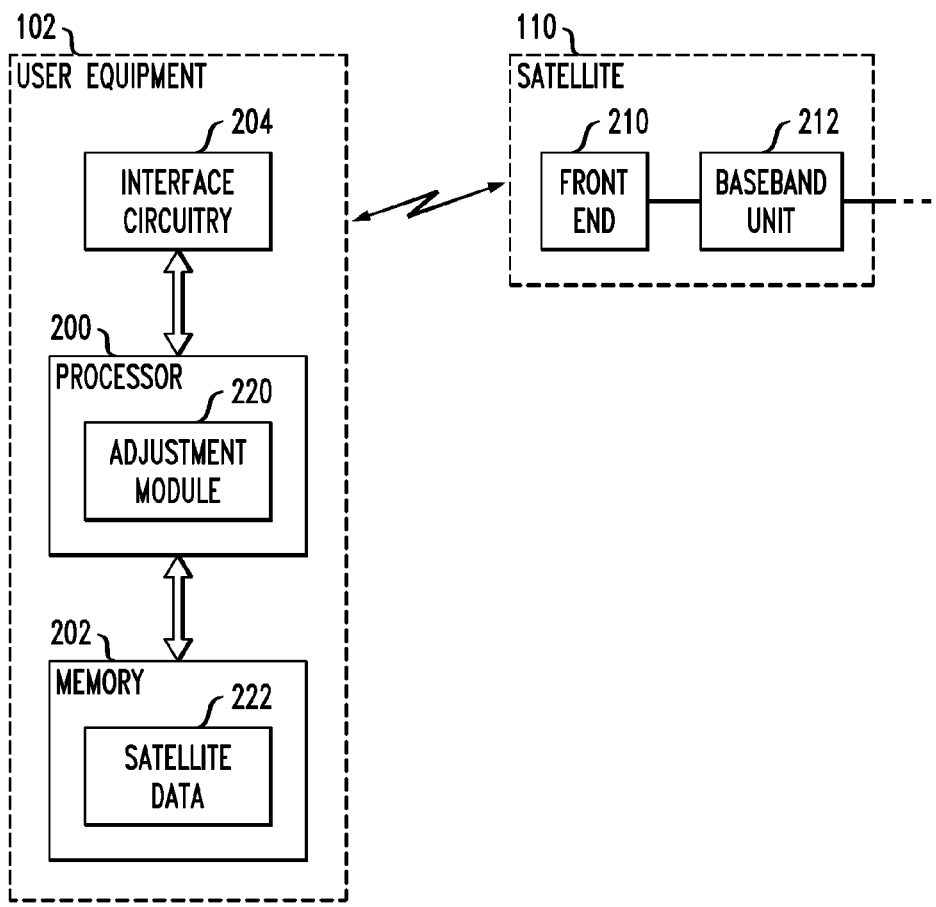
FIG. 2 shows a more detailed view of user equipment and satellite elements in one possible implementation of the FIG. 1 system.

FIG. 2 shows a more detailed view of the user equipment 102 and satellite 110 in the illustrative embodiment. The user equipment comprises a processor 200 coupled to a memory 202 and interface circuitry 204. The satellite 110 comprises a front end 210 coupled to a baseband unit 212. The front end 210 comprises transceiver circuitry including a receiver and a transmitter for communicating with the user equipment 102 via respective uplink and downlink channels. The baseband unit 212 may comprise a digital signal processor or other type of processor for handling uplink data received from the user equipment and downlink data for transmission to the user equipment.

The processor 200 of the user equipment 102 includes a timing and frequency adjustment module 220 that utilizes satellite data 222 stored in the memory 202. Examples of computations that may be performed by module 220 using satellite data 222 will be described in greater detail below in conjunction with FIGS. 3 and 4. The satellite data 222 may comprise data indicative of the position and velocity of the satellite 110, and by way of example may more particularly comprise so-called ephemeris data given by:

$$\vec{E}(t) = \begin{bmatrix} X(t) & Y(t) & Z(t) \\ V_x(t) & V_y(t) & V_z(t) \end{bmatrix},$$

where $X(t)$, $Y(t)$ and $Z(t)$ denote respective x, y and z coordinates of the position of the satellite, and $V_x(t)$, $V_y(t)$ and $V_z(t)$ denote respective x, y and z coordinates of the velocity of the satellite. The latest ephemeris data may be obtained periodically by the user equipment 102 in any number of different ways, such as via a broadcast channel (e.g., eMBMS) from the satellite 110 or from another satellite of the system, via terrestrial cellular links, via side loading, etc. The ephemeris data may thus be received over any type of channel, including a unicast downlink channel of the satellite. If a unicast downlink channel is used, a handshake protocol used to establish a corresponding connection between the satellite and the user equipment may be modified in a straightforward manner to support transmission of the ephemeris data.

It should be noted that the satellite position typically varies in a periodic manner. Hence, the ephemeris data has to be updated periodically. In some embodiments, a relatively coarse update granularity on the order of approximately half an hour or so will be sufficient, but this will of course depend on the configuration of the system. Also, one can interpolate between the points at such a coarse granularity. Generally, the updates should be at a level of granularity that with interpolation provides an uncertainty in inter-UE timing variation that is much smaller than a physical layer tolerance of the system.

The processor 200 may comprise, for example, a microprocessor, an application-specific integrated circuit (ASIC), a digital signal processor or other types of processing device, as well as portions or combinations of such elements.

The memory 202 of the user equipment 102 may be used to store one or more software programs that are executed by the processor 200 to implement at least a portion of the functionality described herein. For example, one or more portions of the timing and frequency adjustment module 220 may be implemented in a straightforward manner using software code stored in memory 202 and executed by the processor 200. The memory 202 is an example of what is more generally referred to herein as a computer program product and still more generally as a computer-readable storage medium that stores executable program code. Such a computer-readable storage medium may comprise, for example, electronic memory such as random access memory (RAM) or read-only memory (ROM), magnetic memory, optical memory or other types of storage elements, as well as portions or combinations of such elements.

The interface circuitry 204 may comprise a transceiver or other communication hardware or firmware that allows the user equipment 102 to communicate with the satellite 110 and other system elements in the manner described herein.

Figure 3:
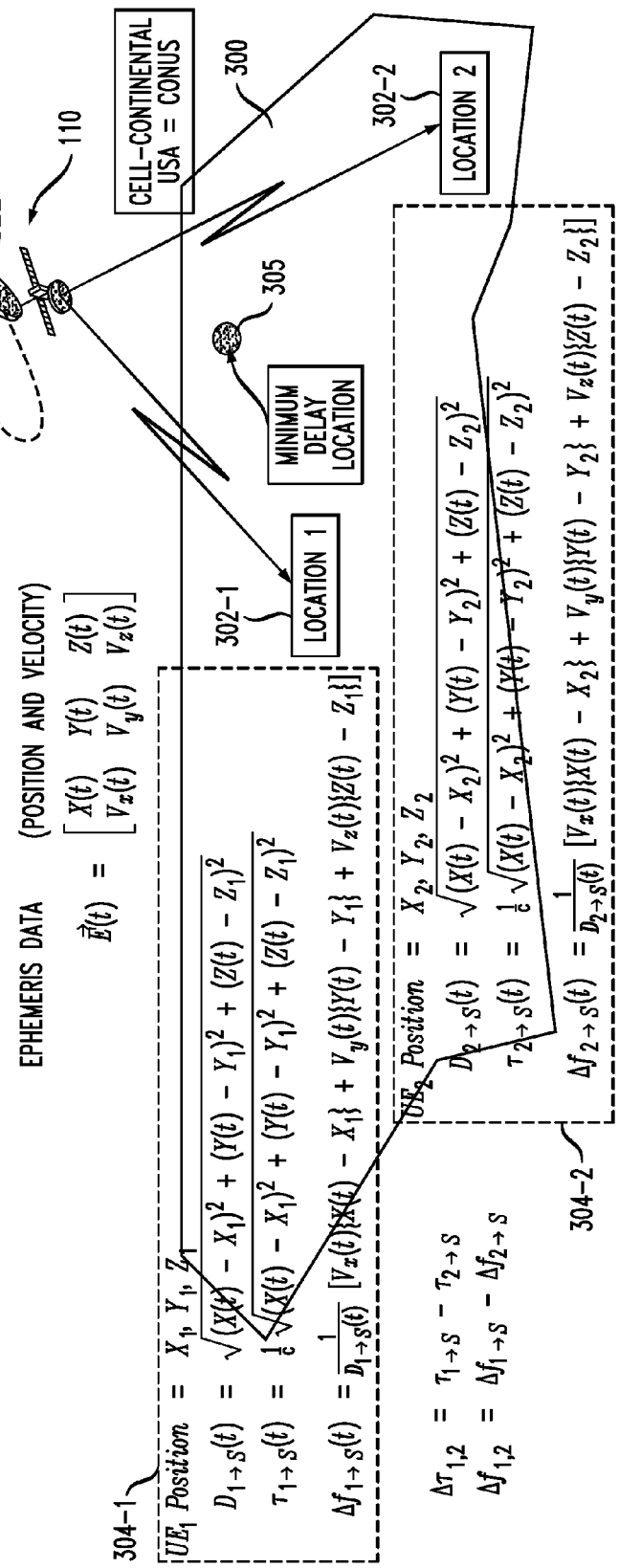
FIG. 3 illustrates the operation of the FIG. 1 system in one embodiment.

Referring now to FIG. 3, the manner in which the above-noted ephemeris data is utilized to adjust timing and frequency of uplink communication within user equipment 102 will now be described. In this embodiment, satellite 110 has a coverage area 300 which corresponds generally to the entire continental United States (CONUS). This coverage area may also be referred to herein as a "cell" of the satellite. It is assumed that a first UE is at location 302-1 in the coverage area, and a second UE is at location 302-2 in the coverage area, with both UEs configured in substantially the same manner as user equipment 102 in FIG. 2. Also, it is assumed that there is another location in the coverage area 300 that is designated as a minimum delay location 305.

The computations performed by the respective adjustment modules 220 of the first and second UE are shown at 304-1 and 304-2, respectively. Generally, each UE in this embodiment determines both a timing adjustment and a frequency adjustment, utilizing the ephemeris data that indicates the latest position and velocity of the satellite 110, and then utilizes the adjustments to control the respective timing and frequency of an uplink communication to the satellite 110. Other embodiments may involve determination of only a timing adjustment, or determination of only a frequency adjustment, and utilization of the determined adjustment to control timing or frequency of an uplink communication.

The first UE at location 302-1 utilizes the position portion of the ephemeris data to compute a measure of the distance between itself and the satellite 110 as follows:

$$D_{1 \to S}(t) = \sqrt{(X(t)-X_1)^2 + (Y(t)-Y_1)^2 + (Z(t)-Z_1)^2}$$

where $X_1, Y_1$ and $Z_1$ denote respective x, y and z coordinates of the position of the first UE at location 302-1, and $X(t), Y(t)$ and $Z(t)$ denote respective x, y and z coordinates of the current position of the satellite 110 as reflected in the ephemeris data.

Similarly, the second UE at location 302-2 utilizes the position portion of the ephemeris data to compute a measure of the distance between itself and the satellite 110 as follows:

$$D_{2 \to S}(t) = \sqrt{(X(t)-X_2)^2 + (Y(t)-Y_2)^2 + (Z(t)-Z_2)^2}$$

where $X_2, Y_2$ and $Z_2$ denote respective x, y and z coordinates of the position of the second UE at location 302-2, and $X(t), Y(t)$ and $Z(t)$ again denote respective x, y and z coordinates of the current position of the satellite 110 as reflected in the ephemeris data.

The data indicative of the position of a given UE may be determined in a variety of different ways. For example, the UE may obtain its position data from a GPS device coupled to or incorporated into the UE, or by any other location mechanism such as NTP, IEEE 1588, direction of arrival, triangularization, etc.

Each of UEs utilizes its corresponding distance measure as determined above to compute a corresponding measure of the time delay between itself and the satellite 110. More specifically, the first UE at location 302-1 computes its delay measure as follows:

$$\tau_{1 \to S}(t) = \frac{D_{1 \to S}(t)}{c}$$

where $D_{1 \to S}(t)$ denotes the distance measure between the first UE and the satellite 110 and c denotes the speed of light. Similarly, the second UE at location 302-2 computes its delay measure as follows:

$$\tau_{2 \to S}(t) = \frac{D_{2 \to S}(t)}{c}$$

where $D_{2 \to S}(t)$ denotes the distance measure between the second UE and the satellite 110 and c denotes the speed of light.

Each of UEs also utilizes its corresponding distance measure as determined above and the velocity portion of the ephemeris data to compute a measure of the frequency variation between itself and the satellite 110. More specifically, the first UE at location 302-1 computes its frequency variation as follows:

$$\Delta f_{1 \to S}(t) = \frac{1}{D_{1 \to S}(t)} [V_x(t)\{X(t)-X_1\} + V_y(t)\{Y(t)-Y_1\} + V_z(t)\{Z(t)-Z_1\}]$$

where $D_{1 \to S}(t)$ denotes the distance measure between the first UE and the satellite 110, and $V_x(t), V_y(t)$ and $V_z(t)$ denote respective x, y and z coordinates of the current velocity of the satellite 110 as reflected in the ephemeris data. Similarly, the second UE at location 302-2 computes its frequency variation as follows:

$$\Delta f_{2 \to S}(t) = \frac{1}{D_{2 \to S}(t)} [V_x(t)\{X(t)-X_2\} + V_y(t)\{Y(t)-Y_2\} + V_z(t)\{Z(t)-Z_2\}]$$

where $D_{2 \to S}(t)$ denotes the distance measure between the second UE and the satellite 110, and $V_x(t), V_y(t)$ and $V_z(t)$ again denote respective x, y and z coordinates of the current velocity of the satellite 110 as reflected in the ephemeris data.

The first and second UEs may each adjust the timing of their uplink communications to the satellite 110 by an amount given by:

$$\text{delay}(t) = \tau_{i \to S}(t) - \tau_{ref}(t)$$

where i=1 denotes the first UE and i=2 denotes the second UE, and where $\tau_{ref}(t)$ is a designated reference delay. For example, the designated reference delay $\tau_{ref}(t)$ may comprise a minimum delay $\tau_{min}(t)$ that is determined relative to the minimum delay location 305 in the coverage area 300 of the satellite 110. The minimum delay $\tau_{min}(t)$ changes over time as the ephemeris data changes. Numerous alternative timing references may be used in place of the minimum delay $\tau_{min}(t)$.

It is also possible for the first UE to make its timing adjustment relative to the second UE rather than relative to the minimum delay location 305. For example, the first UE may adjust its timing by an amount given by:

$$\Delta\tau_{1,2} = \tau_{1 \to S} - \tau_{2 \to S}$$

where as indicated previously $\tau_{1 \to S}$ denotes delay between first UE and the satellite 110 and $\tau_{2 \to S}$ denotes delay between the second UE and the satellite 110. Again, the delay $\tau_{2 \to S}$ above may be replaced with the minimum delay $\tau_{min}(t)$ that is determined relative to the minimum delay location 305.

The first and second UEs may each adjust the frequency of their uplink communications to the satellite 110 by an amount given by the frequency variation $\Delta f_{i \to S}(t)$ computed above, where again i=1 denotes the first UE and i=2 denotes the second UE.

As in the case of the timing adjustment, it also possible for the first UE to make its frequency adjustment relative to the second UE. In this case the amount of frequency adjustment may be given by:

$$\Delta f_{1,2} = \Delta f_{1 \to S} - \Delta f_{2 \to S}$$

where, as mentioned previously $\Delta f_{1 \to S}$ denotes the frequency variation between the first UE and the satellite 110 and $\Delta f_{2 \to S}$ denotes the frequency variation between the second UE and the satellite 110. However, the subtraction of the second frequency variation is not necessary, and for many UEs in the coverage area should be avoided.

Figure 4:
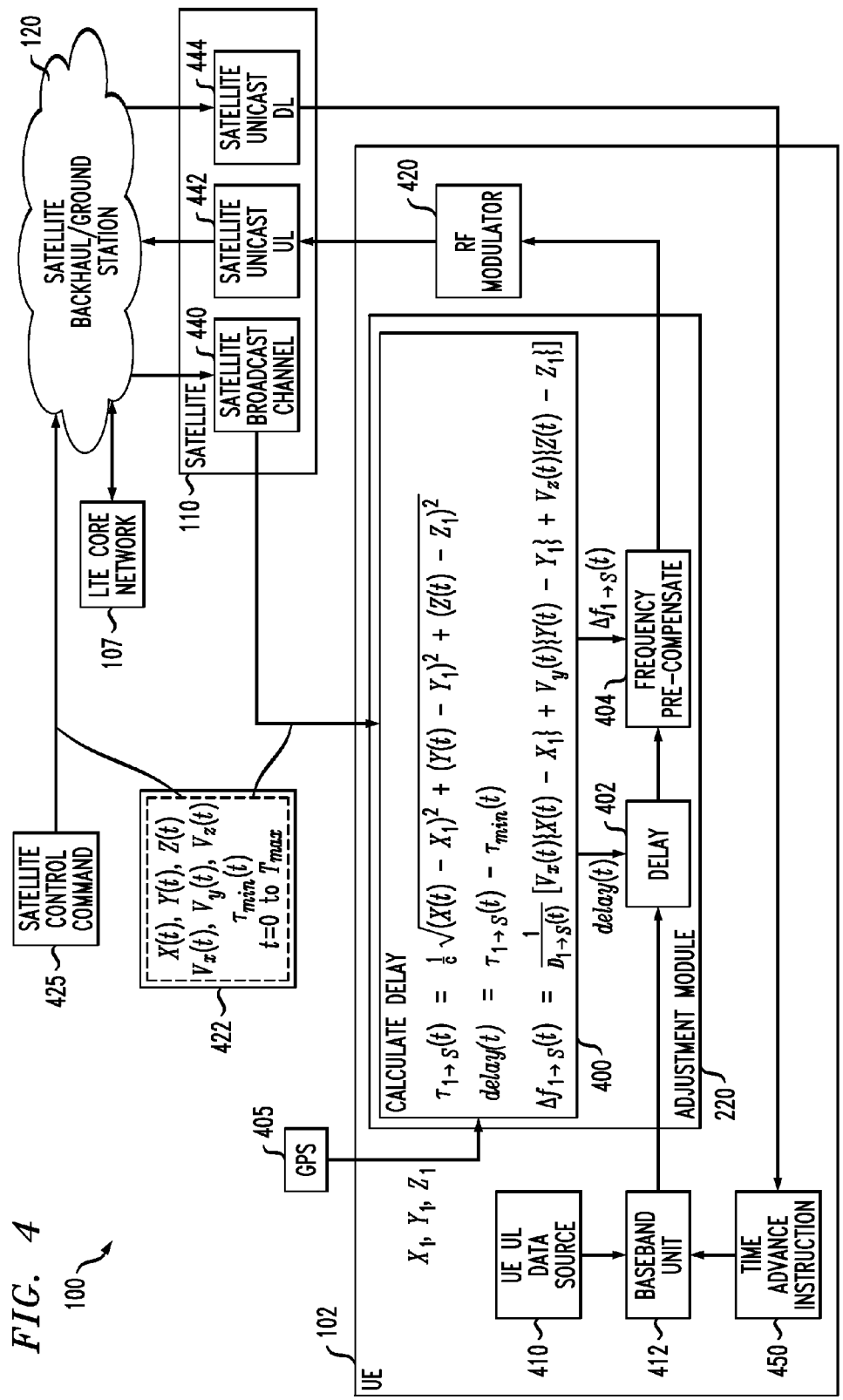
FIG. 4 illustrates the operation of the FIG. 1 system in another embodiment, and shows a more detailed view of the user equipment, satellite and other elements of the system.

FIG. 4 shows another more detailed view of an embodiment of the communication system 100 of FIG. 1. In this embodiment, the adjustment module 220 of user equipment 102 more particularly comprises a computation module 400, a delay adjustment module 402, and a frequency pre-compensation module 404. The computation module 400 calculates the delay measures $\tau_{1 \to S}(t)$ and delay(t) and the frequency variation $\Delta f_{1 \to S}(t)$ in the manner described previously. The delay measure delay(t) is supplied to a control input of the delay adjustment module 402, and the frequency variation $\Delta f_{1 \to S}(t)$ is supplied to a control input of the frequency pre-compensation module 404. The user equipment 102 obtains data indicative of its position $X_1, Y_1$ and $Z_1$ from a GPS device 405 that is illustratively shown as being external to the UE but could alternatively be incorporated into the UE. Also, as noted above, other mechanisms may be used for the UE to obtain data indicative of its position.

The user equipment 102 communicates an uplink signal to the satellite 110 in the following manner. A source signal from uplink data source 410 is applied to a baseband unit 412 for conventional baseband processing. The processed signal is then subject to a timing adjustment in module 402 and a frequency adjustment in module 404 before being applied to an RF modulator 420.

The timing and frequency adjustments applied to the uplink signal in respective modules 402 and 404 are based on ephemeris data 422 that in this embodiment is illustratively supplied from a satellite control and command unit 425 via ground station and backhaul 120 to the satellite 110. The ephemeris data in this embodiment also includes the above-described minimum delay $\tau_{min}(t)$. Associated with the ephemeris data in this embodiment is a value $T_{max}$, which denotes the maximum vector size of the position and velocity data that is transmitted to the user equipment. In other words, vectors of dimension $T_{max}+1$ are sent at each instance of transmission of the ephemeris data. Numerous alternative arrangements may be used for transmission of ephemeris data.

The satellite 110 communicates the ephemeris data 422 to the user equipment 102 over a satellite broadcast channel transmitter 440. Also included in the satellite 110 are a unicast uplink receiver 442 and a unicast downlink transmitter 444. Other satellite transceiver and signal processing elements may be present but are omitted from the figure for simplicity and clarity of description. Also, the user equipment 102 includes a conventional unit 450 for processing time advance instructions received from the satellite unicast downlink transmitter 444. The output of the time advance instruction unit 450 is applied to a control input of the baseband unit 412.

The illustrative communication systems described above in conjunction with FIGS. 1 through 4 advantageously allow multiple UEs to communicate in an orthogonal manner with a given satellite receiver, without unduly increasing the cost or complexity of the system. As noted previously, these arrangements can facilitate use of the satellite for "gap filling" in an otherwise conventional LTE network, as well as implementation of mobile IP services and other mobile communication services via satellite outside of the LTE context.

It is to be appreciated that the particular configuration of the system 100 as shown in FIGS. 1 through 4 is illustrative only. For example, as indicated previously, the present invention is not limited to the LTE context and the disclosed techniques can be adapted in a straightforward manner to a wide variety of other communication system contexts, including any communication system that involves communication between multiple UEs and one or more satellites.

It should therefore again be emphasized that the various embodiments described herein are presented by way of illustrative example only, and should not be construed as limiting the scope of the invention. For example, alternative embodiments of the invention can utilize different communication system configurations, timing or frequency adjustment processes, and user equipment modules than those described above in the context of the illustrative embodiments. Embodiments of the invention can therefore be configured which provide only timing adjustments or only frequency adjustments. These and numerous other alternative embodiments within the scope of the appended claims will be readily apparent to those skilled in the art.

What is claimed is:

1. A method comprising:
   obtaining in user equipment data indicative of position of a satellite;
   obtaining data indicative of position of the user equipment;
   computing a delay measure based on the data indicative of position of the satellite and the data indicative of position of the user equipment; and
   adjusting a timing of a communication transmitted from the user equipment to the satellite based on the delay measure;
   wherein the obtaining data indicative of position of the satellite comprises receiving data indicative of position and velocity of the satellite; and
   wherein the data indicative of the position and velocity of the satellite comprises ephemeris data given by:

$$\vec{E}(t) = \begin{bmatrix} X(t) & Y(t) & Z(t) \\ V_x(t) & V_y(t) & V_z(t) \end{bmatrix},$$

where $X(t)$, $Y(t)$ and $Z(t)$ denote respective x, y and z coordinates of the position of the satellite, and $V_x(t)$, $V_y(t)$ and $V_z(t)$ denote respective x, y and z coordinates of the velocity of the satellite.

2. The method of claim 1 wherein the ephemeris data is received in the user equipment over a channel other than a unicast downlink channel of the satellite.

3. The method of claim 2 wherein the ephemeris data is received in the user equipment over a broadcast channel of the satellite.

4. The method of claim 1 wherein computing the delay measure comprises computing a measure of distance between the user equipment and the satellite and computing the delay measure based on the distance measure.

5. The method of claim 4 wherein the distance measure is computed as follows:

$$D_{i \to S}(t) = \sqrt{(X(t)-X_i)^2+(Y(t)-Y_i)^2+(Z(t)-Z_i)^2}$$

where $X_i$, $Y_i$ and $Z_i$ denote respective x, y and z coordinates of the position of the user equipment, and $X(t)$, $Y(t)$ and $Z(t)$ denote respective x, y and z coordinates of the position of the satellite.

6. The method of claim 5 wherein adjusting the timing of the communication comprises adjusting the timing by an amount given by:

$$\text{delay}(t) = \tau_{i \to S}(t) - \tau_{ref}(t)$$

where $\tau_{ref}(t)$ is a designated reference delay and $\tau_{i \to S}(t)$ is computed as follows:

$$\tau_{i \to S}(t) = \frac{D_{i \to S}(t)}{c}$$

where $D_{i \to S}(t)$ denotes the distance measure and c denotes the speed of light.

7. The method of claim 6 wherein the designated reference delay $\tau_f(t)$ comprises a minimum delay $\tau_{min}(t)$ that is determined relative to a minimum delay location in a coverage area of the satellite.

8. The method of claim 1 wherein adjusting the timing of the communication comprises adjusting the timing based on the delay measure and another delay measure computed by other user equipment.

9. A method comprising:
obtaining in user equipment data indicative of position of a satellite;
obtaining data indicative of position of the user equipment;
computing a delay measure based on the data indicative of position of the satellite and the data indicative of position of the user equipment; and
adjusting a timing of a communication transmitted from the user equipment to the satellite based on the delay measure;
wherein adjusting the timing of the communication comprises adjusting the timing based on the delay measure and another delay measure computed by other user equipment; and
wherein adjusting the timing of the communication comprises adjusting the timing by an amount given by:

$$\Delta \tau_{1,2} = \tau_{1 \to S} - \tau_{2 \to S}$$

where $\tau_{1 \to S}$ denotes delay between first user equipment and the satellite and $\tau_{2 \to S}$ denotes delay between second user equipment and the satellite.

10. The method of claim 1 further including the step of adjusting a frequency of the communication transmitted from the user equipment to the satellite based on the data indicative of position and velocity of the satellite.

11. A method comprising:
obtaining in user equipment data indicative of position of a satellite;
obtaining data indicative of position of the user equipment;
computing a delay measure based on the data indicative of position of the satellite and the data indicative of position of the user equipment;
adjusting a timing of a communication transmitted from the user equipment to the satellite based on the delay measure; and
adjusting a frequency of the communication transmitted from the user equipment to the satellite based on the data indicative of position and velocity of the satellite;
wherein the obtaining data indicative of position of the satellite comprises receiving data indicative of position and velocity of the satellite; and
wherein adjusting the frequency of the communication comprises adjusting the frequency by an amount given by:

$$\Delta f_{i \to S}(t) = \frac{1}{D_{i \to S}(t)}[V_x(t)\{X(t)-X_i\}+V_y(t)\{Y(t)-Y_i\}+V_z(t)\{Z(t)-Z_i\}]$$

where $D_{i \to S}(t)$ denotes a distance measure between the user equipment and the satellite, $X_i$, $Y_i$ and $Z_i$ denote respective x, y and z coordinates of the position of the user equipment, $X(t)$, $Y(t)$ and $Z(t)$ denote respective x, y and z coordinates of the position of the satellite, and $V_x(t)$, $V_y(t)$ and $V_z(t)$ denote respective x, y and z coordinates of the velocity of the satellite.

12. The method of claim 10 wherein adjusting the frequency of the communication comprises adjusting the frequency based on a first frequency variation computed by first user equipment and a second frequency variation computed by second user equipment.

13. A method comprising:
obtaining in user equipment data indicative of position of a satellite;
obtaining data indicative of position of the user equipment;
computing a delay measure based on the data indicative of position of the satellite and the data indicative of position of the user equipment;
adjusting a timing of a communication transmitted from the user equipment to the satellite based on the delay measure; and
adjusting a frequency of the communication transmitted from the user equipment to the satellite based on the data indicative of position and velocity of the satellite;
wherein the obtaining data indicative of position of a satellite comprises receiving data indicative of position and velocity of the satellite;
wherein adjusting the frequency of the communication comprises adjusting the frequency based on a first frequency variation computed by first user equipment and a second frequency variation computed by second user equipment; and
wherein adjusting the frequency of the communication comprises adjusting the frequency by an amount given by:

$$\Delta f_{1,2} = \Delta f_{1 \to S} - \Delta f_{2 \to S}$$

where $\Delta f_{1 \to S}$ denotes frequency variation between the first user equipment and the satellite and $\Delta f_{2 \to S}$ denotes frequency variation between the second user equipment and the satellite.

14. The method of claim 1 further comprising transmitting the timing adjusted communication to the satellite over a unicast uplink channel.

15. A computer-readable storage medium having embodied therein executable program code that when executed by a processor of the user equipment causes the user equipment to perform the steps of the method of claim 1.

16. An apparatus comprising:
    user equipment configured for communication with a satellite;
    the user equipment being operative to obtain data indicative of position of a satellite, to obtain data indicative of position of the user equipment, to compute a delay measure based on the data indicative of position of the satellite and the data indicative of position of the user equipment, and to adjust a timing of a communication transmitted from the user equipment to the satellite based on the delay measure;
    wherein obtaining data indicative of position of the satellite comprises receiving data indicative of position and velocity of the satellite; and
    wherein the data indicative of the position and velocity of the satellite comprises ephemeris data given by:

$$\vec{E}(t) = \begin{bmatrix} X(t) & Y(t) & Z(t) \\ V_x(t) & V_y(t) & V_z(t) \end{bmatrix},$$

where $X(t)$, $Y(t)$ and $Z(t)$ denote respective x, y and z coordinates of the position of the satellite, and $V_x(t)$, $V_y(t)$ and $V_z(t)$ denote respective x, y and z coordinates of the velocity of the satellite.

17. The apparatus of claim 16 wherein the user equipment comprises:
    a processor;
    a memory coupled to said processor; and
    a network interface adapted for communication with the satellite.

18. An integrated circuit comprising the apparatus of claim 16.

19. The apparatus of claim 16, wherein adjusting the timing of the communication comprises adjusting the timing based on the delay measure and another delay measure computed by other user equipment; and
    wherein adjusting the timing of the communication comprises adjusting the timing by an amount given by:

$$\Delta\tau_{1,2} = \tau_{1\to S} - \tau_{2\to S}$$

where $\tau_{1\to S}$ denotes delay between first user equipment and the satellite and $\tau_{2\to S}$ denotes delay between second user equipment and the satellite.

20. The apparatus of claim 16, wherein the user equipment is further operative to adjust a frequency of the communication transmitted from the user equipment to the satellite based on the data indicative of position and velocity of the satellite;
    wherein obtaining data indicative of position of the satellite comprises receiving data indicative of position and velocity of the satellite; and
    wherein adjusting the frequency of the communication comprises adjusting the frequency by an amount given by:

$$\Delta f_{i\to S}(t) = \frac{1}{D_{i\to S}(t)}[V_x(t)\{X(t) - X_i\} + V_y(t)\{Y(t) - Y_i\} + V_z(t)\{Z(t) - Z_i\}]$$

where $D_{i\to S}(t)$ denotes a distance measure between the user equipment and the satellite, $X_i$, $Y_i$ and $Z_i$ denote respective x, y and z coordinates of the position of the user equipment, $X(t)$, $Y(t)$ and $Z(t)$ denote respective x, y and z coordinates of the position of the satellite, and $V_x(t)$, $V_y(t)$ and $V_z(t)$ denote respective x, y and z coordinates of the velocity of the satellite.

21. The apparatus of claim 16, wherein the user equipment is further operative to adjust a frequency of the communication transmitted from the user equipment to the satellite based on the data indicative of position and velocity of the satellite;
    wherein obtaining data indicative of position of the satellite comprises receiving data indicative of position and velocity of the satellite;
    wherein adjusting the frequency of the communication comprises adjusting the frequency based on a first frequency variation computed by the user equipment and a second frequency variation computed by another user equipment; and
    wherein adjusting the frequency of the communication comprises adjusting the frequency by an amount given by:

$$\Delta f_{1,2} = \Delta f_{1\to S} - \Delta f_{2\to S}$$

where $\Delta f_{1\to S}$ denotes frequency variation between the user equipment and the satellite and $\Delta f_{2\to S}$ denotes frequency variation between the second user equipment and the satellite.

* * * * *